United States Patent

Schmidt

[15] 3,675,875

[45] July 11, 1972

[54] CORRUGATED LINER FOR RECORDING TAPE CASSETTES

[72] Inventor: Paul Gordon Schmidt, Wilmington, Del.

[73] Assignee: E. I. du Pont de Nemours and Company, Wilmington, Del.

[22] Filed: Oct. 12, 1970

[21] Appl. No.: 80,049

[52] U.S. Cl. .......... 242/199, 174/107

[51] Int. Cl. .......... G11b 23/08

[58] Field of Search .......... 174/107; 242/199, 200, 198, 242/210, 71.1, 71.2, 197

[56] References Cited

UNITED STATES PATENTS

| | | | |
|---|---|---|---|
| 3,027,110 | 3/1962 | Andrews | 242/210 |
| 3,556,433 | 1/1971 | Aritboul | 242/199 |
| 3,244,799 | 4/1966 | Roberts | 174/107 |

*Primary Examiner*—George F. Mautz
*Attorney*—Francis A. Paintin

[57] ABSTRACT

A recording tape cassette sheet liner of corrugated thermoplastic film, preferably polyethylene terephthalate film, wherein the corrugation ratio is between 1.5 and 15, preferably between 2 and 6, and wherein there are from 5 to 50 corrugations per inch. The cassette has such a liner on at least one side of the tape spools.

2 Claims, 4 Drawing Figures

INVENTOR
PAUL GORDON SCHMIDT

BY Francis A. Painter
ATTORNEY

CORRUGATED LINER FOR RECORDING TAPE CASSETTES

BACKGROUND OF THE INVENTION

This invention relates to materials for use in recording apparatus and, more particularly, to a corrugated liner for use in a cartridge or cassette which carries a spool of flexible web such as a magnetic recording tape.

Recording apparatus using spools of magnetic tapes in a cassette have reached a high stage of development. As is well known, the cassette is a generally rectangular casing which encloses a pair of spools. The casing is enclosed on all sides except one edge and the spools each rotate within a hub mounted in the casing walls. The tape is initially wound on one of the spools and passes over onto and is wound around the other spool as it is used for recording and playback.

Since a principal object for using a cassette is to provide maximum capacity in the smallest amount of space, the spools do not have flanges to guide and retain the tape as it is being wound and unwound. It is customary to use sheet liners between the walls of the cassette and the tape passing around the spools to avoid tracking problems which arise when flanges are removed.

Conventional cassette liners are described in Liddle, U.S. Pat. No. 3,259,331, and Redfield, U.S. Pat. No. 3,027,111. The cassette liners fulfill a number of functions, e.g., guiding the tape between the cassette walls, cushioning the tape against lateral movement, dampening motion noise and erratic tape motions, etc.

It is known to use flat polyester sheet liners in magnetic tape sets. However, such liners exhibit rather substantial frictional forces against the tape on the spool when "telescoping" occurs, i.e., the lateral movement and thus lateral buildup of the tape on a spool. Cassette liners have been developed using carbon-impregnated fluorocarbon resins. These liners do, indeed, develop very low amounts of friction but are extremely expensive. Another development has been to carbon-coat polyester film. This results in an improvement in friction but also adds to the cost of polyester and involves a coating step.

SUMMARY OF THE INVENTION

Briefly stated, the invention is an improved sheet liner for recording-tape cassettes comprising a sheet of thermoplastic film, the improvement being that the film is a corrugated film having a corrugation ratio between about 1.5 and 15, preferably between about 2 and 6. The invention also includes cassettes having at least one of such sheet liners.

DETAILED DESCRIPTION OF THE INVENTION

The invention will now be described in connection with the accompanying drawing wherein.

Figure 1:
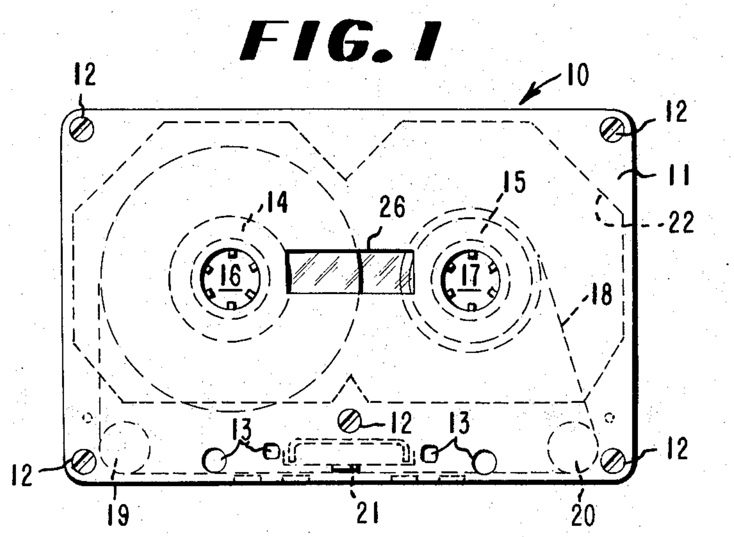
FIG. 1 is a top view of a typical cassette in accordance with this invention.
Figure 2:
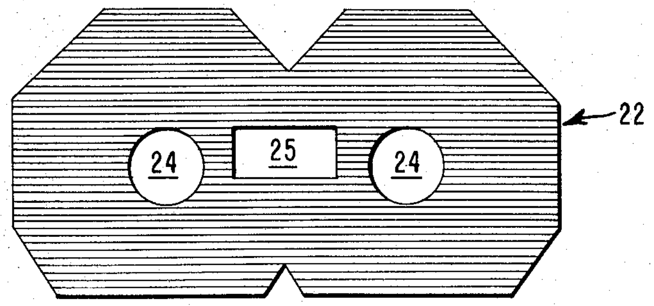
FIG. 2 is a top view of a cassette liner in accordance with this invention.
Figure 3:
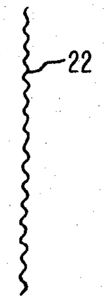
FIG. 3 is an end view of the cassette liner of FIG. 2.

Referring now to the drawing, cassette 10 has a pair of casing walls 11 fastened together by screws 12. Guide holes 13 are provided to register with appropriated meanS on a recorder. A pair of spools 14 and 15 are located on the inside of the cassette and rotate within hubs 16 and 17. A recording tape 18 is partially wound around both spools 14 and 15 and passes from one to the other around rollers 19 and 20. Along the line of travel of the magnetic tape 18 between rollers 19 and 20 is a suitably mounted pressure pad 21.

Figure 4:
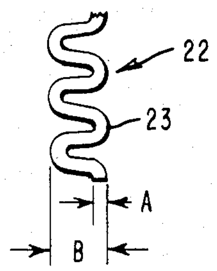
FIG. 4 is a portion of the end view of FIG. 3 magnified for the purposes of clarity.

Located between each casing wall 11 and each side of the spools 14 and 15 is a cassette liner 22 having a plurality of horizontal corrugations 23 as shown in FIG. 4. These can run in a vertical direction if desired. The liner 22 has a pair of openings 24 that register with cassette hubs 16 and 17 and an opening 25 in register with the window 26 in the cassette which is there for the purpose of visually noting the amount of tape remaining on spools 14 and 15. Further details concerning the assembly and use of the cassette described according to this invention are known in the prior art, e.g., the Redfield and Liddle patents mentioned hereinabove.

A preferred material for use in making the cassette liners of this invention is polyethylene terephthalate film, preferably between about 0.0005 to 0.002 inch thickness. It is preferred to have between about 5 and 50 corrugations per inch of film length. Corrugated polyethylene terephthalate film per se is known in the art as revealed, for example, by Roberts, U.S. Pat. No. 3,244,799, and Roberts et al., Swiss Pat. No. 440,673, issued July 31, 1967.

Referring now to FIG. 4, the thickness of the film before corrugation is represented by the letter *A* and the thickness of the resulting corrugated film is represented by the letter *B*. For the purposes of discussing this invention, the corrugation ratio is defined as follows:

$$\text{Corrugation Ratio} = \frac{\text{Thickness of Corrugated Film}}{\text{Thickness of Initial Film}} = \frac{B}{A}$$

The corrugation ratio of films used for cassette liners in this invention is between about 1.5 and 15. When the corrugation ratio is less than about 1.5, the significance of using a corrugated film over a flat film is not too great; however, the preparation of films having a corrugation ratio greater than about 15 is not especially practical. It is particularly preferred that the corrugation ratio be between about 2 and 6.

A specific liner representative of this invention is a polyethylene terephthalate sheet liner having 33 corrugations per inch and a 4.3 corrugation ratio formed from a sheet originally 0.001 inch in thickness.

Liners made in accordance with this invention have been found to exhibit frictional characteristics at least as good as, and sometimes better than, cassette liners prepared from carbon-coated polyester films and carbon-impregnated fluorocarbon films. Further, the cassette liners of this invention have been evaluated by tests which measure the number of times the cassette jams or binds during an extended period of operation and have been found to equal or better the performance of the cassettes using the aforementioned carbon-lubricated liners on most all occasions.

The cassette liners of this invention also are found to alleviate "telescoping." These liners reduce the effects of telescoping by reducing the friction between the takeup spool and the walls of the cassette and also reduce the degree of telescoping by exerting a positive compressive force on the cassette takeup spool. The electrostatic propensities of the cassette liners of this invention have also been found to be more satisfactory than the flat polyester film liners.

Improved compressive force can be built into the cassette liners by creating a bow in the liner, i.e., by putting in a partial crease running parallel to the long direction of the liner irrespective of the direction of corrugations; however, a horizontal bow with horizontal corrugations is preferred.

In summary, the cassette liners of this invention greatly outperform the flat polyester liners of the prior art and are at least equal in performance but do not involve the coating or impregnation required by the carbon-lubricated cassette liners discussed hereinabove.

As many widely different embodiments of this invention may be made without departing from the spirit and scope thereof, it is to be understood that this invention is not limited to the specific embodiments thereof except as defined in the appended claims, and all changes which come within the meaning and range of equivalence are intended to be embraced therein.

I claim:

1. In a sheet liner for recording-tape cassettes comprising a sheet of thermoplastic film, the improvement wherein the frictional characteristics of said liner are improved by said film being a corrugated polyethylene terephthalate film having a corrugation ratio between about 2 and 6 and wherein said sheet has between about 5 and 50 corrugations per inch.

2. In a recording-tape cassette having a pair of rotating spools located within a cassette casing and a sheet liner on at least one side of said spools within said casing, the improvement wherein at least one of said liners has improved frictional characteristics by said liner being of a corrugated thermoplastic polyethylene terephthalate film having a corrugation ratio between about 2 and 6 and wherein said sheet liner has between about 5 and 50 corrugations per inch.

* * * * *